United States Patent [19]
Stanford et al.

[11] Patent Number: 5,930,363
[45] Date of Patent: *Jul. 27, 1999

[54] CARD CHARGING SYSTEMS

[75] Inventors: Christopher John Stanford, Harpenden, United Kingdom; Eduard Karel De Jong, Amsterdam, Netherlands

[73] Assignee: Transmo Limited, Royston, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,954
[22] PCT Filed: Mar. 17, 1995
[86] PCT No.: PCT/GB95/00596
§ 371 Date: Jan. 17, 1996
§ 102(e) Date: Jan. 17, 1996
[87] PCT Pub. No.: WO95/26014
PCT Pub. Date: Sep. 28, 1995
[51] Int. Cl.[6] ............................. H04L 9/00; H04L 9/30
[52] U.S. Cl. ..................... 380/24; 380/4; 380/9; 380/23; 380/25; 380/30; 380/49; 380/50; 235/379; 235/380; 705/26; 705/35; 705/39; 705/40; 705/44
[58] Field of Search .................. 380/4, 9, 23, 24, 380/25, 30, 49, 50, 59; 235/379, 380; 705/26, 35, 38, 39, 40, 41, 42, 43, 44

[56] References Cited

U.S. PATENT DOCUMENTS 5,036,461  7/1991  Elliott .
5,337,358  8/1994  Axelrod et al. ............................ 380/23

FOREIGN PATENT DOCUMENTS 0 380 377  8/1990  European Pat. Off. .

*Primary Examiner*—Bernarr E. Gregory
*Attorney, Agent, or Firm*—Lee, Mann, Smith, McWilliams, Sweeney & Ohlson

[57] ABSTRACT

A security device for use in a card charging system where a service or product providing facility issues services or products by the use of credit from a card. The security device comprises signal transmission means for delivering signals to a purchasing facility to enable a user to acquire a service or product dependent on the credit debited from a card, a record keeping subsystem to certify the credit debited from the card and to identify which account is to receive the debited credit and signal processing and output means for generating signals indicating a successful transaction. The signals may be encoded by use of encryption techniques. A separable security subsystem is provided to ensure a record of transactions is available if power fails on the main security device.

32 Claims, 2 Drawing Sheets

CARD CHARGING SYSTEMS

FIELD OF INVENTION

This invention concerns card charging systems of the type in which a pre-programmed card is read and validated by a suitable card reader and data stored on the card is decremented according to the cost of a purchase and made available to the user after the transaction. The invention is concerned with a security device to be installed in such a system to ensure correct control between the card read/write unit and a transaction recording—payment collection system so as to form an integral part of the revenue allocation process.

BACKGROUND TO THE INVENTION

It is known to provide coin, token or card operated mechanisms for the collection of payment for goods or services such as bus fare collection systems, pay and display parking devices, prepared food delivery systems and the like. Such devices may be capable of debiting prepaid or credit cards such as the systems currently in use for the provision of telecommunication services and the concept of a prepayment credit card for obtaining bus journeys and tickets for train journeys has already been tried.

It is an object of the present invention to enable such systems to accept a universal prepurchased stored value or debit card and to allow the amount which has been debited from the card to be allocated to the appropriate service or goods provider.

SUMMARY OF THE INVENTION

According to the present invention there is provided a security and transaction device for use in connection with a card read/write device, comprising; signal transmission means for delivering signals to a host facility to enable a purchase to be made in return for an amount of credit debited from a card after the latter has been read by a card reader, which signals comprise a unique identification number together with signals defining a public key-based security subsystem; a record keeping subsystem adapted to certify a credit debited from the card and identify which one of a plurality of accounts is to receive the debited credit; and signal processing and output means for generating signals indicative of a successful transaction and of an appropriate form and value so that in use the generated signal indicates to the host facility the nature of the transaction completed and the purchase which is now to be made available.

The host facility may be a service providing facility where the purchase involves provision of a service such as transportation, seating in an auditorium or the like.

Alternatively the host facility may be a product providing facility where the purchase involves supply of a product such as foodstuffs, clothing, medication and the like.

Optionally the device includes a smart card reader and further signal processing means, whereby a smart card open payment system may be employed in lieu of a prepayment credit card system, for payment for a service or commodity.

According to one embodiment of the invention a security module is provided in connection with each transaction recording system which is adapted to receive a specific machine readable card and the security module serves to ensure correct control between the card read/write unit and the host controlling equipment to which it is attached.

Thus in the case of a bus fare collection system, pay and display parking and the like, the security module is situated between the card reader and the mechanism for dispensing a bus ticket or pay and display parking ticket or the like.

In this embodiment the security module forms all integral part of the revenue allocation process since the security module enables the issuer of the card to be identified and thereby enables the service or commodity provider to identify the organisation from which it is to recover the funds relevant to the transaction provided by the service or commodity provider.

It is a characteristic of the system proposed by the invention that no direct link between service provider and issuer need exist if a centralised accounting facility is provided with credit and debit accounts for each of the issuers and/or service or commodity providers. (It is to be understood that both issuers and service/commodity providers may be one and the same, but in the general case they need not be). By matching transactions identified as credits to a service or a commodity providers account against a corresponding debit for the same amount as the transaction in an issuers account, so the overall debit/credit position remains neutral.

Even if the card has been purchased from the organisation providing the service, the principle holds good since the service provider (or commodity provider) who has sold the card in the first place will have had an overall debit equal to the value of the card entered on its debit account and when the card is used to purchase its services or commodities, the corresponding credits would appear in its credit account neutralising the transaction. The money received for the card will remain in the service or commodity providers hands and if the total value of the card is used to purchase services or commodities provided by the same organisation who issued the card, the net effect is simply that the person purchasing the card has paid in advance to the same organisation the necessary funds to obtain the subsequent services or commodities or both from that self same organisation.

Where the card is purchased from an issuer then the issuers account is debited by the total value of the card and is subsequently credited as the card is used to purchase services or commodities from other organisations. At the end of any accounting period the debit and credit position of the various organisations whether issuing cards or providing services or commodities or both, is balanced off and any net inflow of funds necessary to balance the accounts is requested by the central billing organisation of the different organisations as appropriate.

Typically the machine readable card is a magnetic strip card capable of being read and written to by appropriate card read/write devices.

According to a particular preferred feature of the invention, the security module is adapted to recognise a specific identification code and card issuer identification details from a datastream derived from the card and passing between the card reader and host equipment. The security module deduces the value of the successful transaction and adds this to the total value collected for each card issuer and is stored within the security module.

Preferably the total value collected and the identification information and the like is digitally certified.

Preferably the data is stored in a non-volatile manner in a memory associated with the security module.

Preferably the memory is a non-volatile memory and is located in a security subsystem.

Preferably the subsystem is separable from the remainder of the security module or from a part thereof to enable it to be removed, for example from a vehicle such as a bus for park and display ticket issuing, and data therein downloaded into a host computer for processing and updating the accounts of card issuers and host facilities, such as service/commodity providers as aforesaid.

In order to build in an audit trail, a new total value for each issuer and previous totals of all cards from all issuers that have been accepted by a particular service host (eg ticket issuing device) are certified with a digital signature and transmitted to the service host at the end of each transaction. Thus the security module not only retains within its security subsystem a complete record of accumulated totals for each card issuer, but this information is also stored in the service host such as a ticket issuing machine memory. In the event of lost records, details of the transactions associated with the service host can be retrieved from the security subsystem of the security module and vice versa.

According to a preferred feature of the invention, although the security subsystem is primarily concerned with payment records, additional information may be read and written to the cards by some service providers and to facilitate this the security module must provide a data highway between the host equipment and the card read/write unit to enable the service host such as a ticket issuing machine to transfer the data to the card. To this end the security module of the invention needs to appear transparent between the card read/write unit and the service host at least as regards such additional information.

In one particular system, involving the issue of tickets on a bus, at the end of a shift or service providers accounting period, all of the individual issuer totals accumulated in the service host memory are collected from the service host by whatever method the service provider chooses. Typically transportable modules are employed in the case of buses, on-line or via portable data collection terminals in the case of pay and display equipment or even paper records as appropriate. It is to be noted that although reference is made here only to service provider, the term is intended to include commodity providers.

The information relating to individual issuer totals is preferably fed into data concentrating host computers held by the service providers for later polling by an accounts clearing centre.

Since the security module subsystem memory stores separate and duplicated non-resettable totals for every issuer whose cards have been used in the particular service host in which the security module is installed, in the event of records being lost, the next time that records are collected from the service host they will be recovered.

In the event of a complete equipment breakdown, the security module can be removed from the equipment and either of the duplicated records stores accessed by the clearing centre to recover the data.

Preferably each security module holds a unique identifier which is used to identify the service host to which it is fitted and with which it has been used.

Preferably the security subsystem is a tamper resistant single integrated circuit device or chip which has a built-in processor and co-processor capable of generating irrefutable digital signatures at high speed. Preferably it also has sufficient non-volatile storage to hold totals for a large number of issuers typically 500 issuers. This security system can be externally powered separately from the rest of the security module circuitry such that contents can be accessed by the central accounts facility even if the majority of other components within the security module are down or have become faulty.

The digital signatures are generated using public key cryptographic methods. This means the clearing centre and any issuer can verify the correctness of the signed files but cannot themselves generate the signatures, ie create new files.

If any records are tampered with along the route from service providers equipment to the clearing centre, it will be discovered. Likewise, preferably means is embedded in the security architecture to detect duplicated records and to detect if records are missing.

As previously indicated, preferably after each transaction the new total is signed with a digital signature and the digital signature generation is likewise preferably based on a public key system (RSA or equivalent) and the security module provides a tamper resistant storage of secret keys.

Preferably the security module is capable of generating the digital signature aforesaid in less than one second.

The result of each transaction together with the signature is stored in the security subsystem as aforesaid and is also transmitted to the surface host equipment for storage therein.

Preferably when a security module is removed from its normal installation (for example for reconciliation where all other means cannot be used), then the card reader should be disabled and the ability to generate valid certificates is lost until the or another security module is inserted.

Preferably the collection of data pertaining to the payment transactions as registered by the combined security module and security subsystem module is handled in accordance with a formally defined protocol. In a preferred arrangement the protocol is based on maintaining a running total of transaction values.

The main part of the protocol is implemented in the security subsystem. To this end it may secure in permanent (non-volatile) memory of the security subsystem device, two running total counters (a running total of transaction values and a running total of the number of transactions), are kept for each issuer of cards. After each transaction the security subsystem is adapted to compute a digital signature on the latest value of the stored counters and the digital signature warrants the validity of the counter values as it is based on the unique secret encryption key stored in the security subsystem.

The digital signature enables the validity of the counter values to be warranted since it is based on a unique secret encryption key stored in the security subsystem.

Preferably after obtaining the digital signature the security module continues the protocol and together with accumulating countervalues which the security module maintains in parallel in its own memory, the new signature is packed into a number of records and transferred to the service host.

A final step of the protocol is performed in the central clearing facility which is adapted to receive the records from a security module through its connection with an acquirer host. The clearing centre retrieves from its storage the last known values of the accumulating countervalues from this host. In subtracting the corresponding counters in the received and the stored records, the net amount spent with cards for each issuer can be computed and the computed amount logged on disc and paper as appropriate.

The transfer of money based on the computed results does not form part of the protocol but can be effected as soon as the computed amounts have been determined and stored.

It will be seen that the protocol as outlined is immune to any disruption, accidental or purposeful of the communication from the security module to the central clearing centre.

In particular, the connection between service host and acquiring host is assumed to be unreliable where records may get lost or be duplicated without consequence. Primarily the protocol is protected by the digital signature and subsidiary protection is obtained by inclusion of the security subsystem and security module identity numbers and account of the current number of transactions in the signed message.

As increased numbers of issuers are recognised by the system, the number of totals kept within each security module will increase. Whilst the security module can handle sufficient issuer totals the transmission on every occasion of the records relating to for example 500 issuers becomes time consuming and could effect the ability of a particular service host to process transactions at high speed.

According therefore to a preferred feature of the invention, means is provided within the security module to determine whether or not to include the total from each of the records and a criterion for determining not to include the total from a particular record may be linked to time during which there has been a lack of activity in relation to that particular total.

Typically the time interval is determined by the total number of transactions carried out by the security module since the last change made to any particular total. The value of this number (of transactions) is set by the maximum number of transactions per day plus a significant safety margin to ensure that several copies of the records containing the final value of the total about to be omitted have been captured by the clearing centre. This may be determined by examination of the transaction history files accumulated at the transaction clearing centre.

According to a further preferred feature of the invention, each security module includes means for storing and generating a secret key which is used to generate a digital signature based on a public key scheme (RSA or equivalent) and periodically the secret key used by the security module is changed.

The change may be automatic in a pseudo-random manner as determined by for example the overall number of transactions processed by the security module.

Preferably the key change instances are known to the clearing centre for each security module on an individual basis so that this information can be logged and used in decoding and auditing reports from security module data.

BRIEF DESCRIPTION OF THE DRAWINGS

The invention will now be described in outline only by way of example with reference to the accompanying drawings in which.

DETAILED DESCRIPTION OF DRAWINGS

Figure 1:
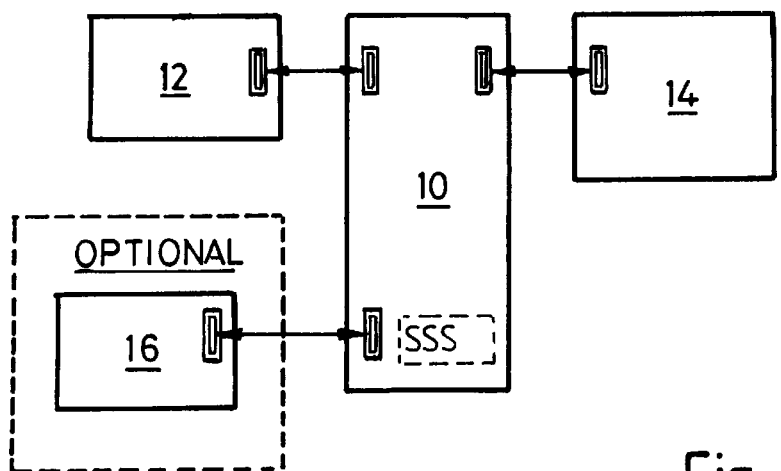
FIG. 1 shows a security module inserted into an existing card accepting payment system.

FIG. 1 shows the security module 10 of the invention located between a magnetic card read/write device 12 and a conventional service or commodity providers apparatus for supplying a service or a commodity as appropriate such as a card operated ticket dispenser 14.

The Magnetic card read/write device 12 may be, for example, one as supplied by GPS Card Technology. Suitable card operated ticket dispenses are wayfarer's 3 and Metric Autoslot.

In known manner the latter is designed to be operated by means of prepayment cards of a particular type and the module 10 of the invention allows cards other than those purchased from the service/commodity provider to be used to purchase the service or commodity concerned.

An optional extra comprises a smart card read/write device 16 by which a so-called smart card can be used to purchase the service or commodity in lieu. Typical smart card read/write devices are supplied by Schlumberger.

Figure 2:
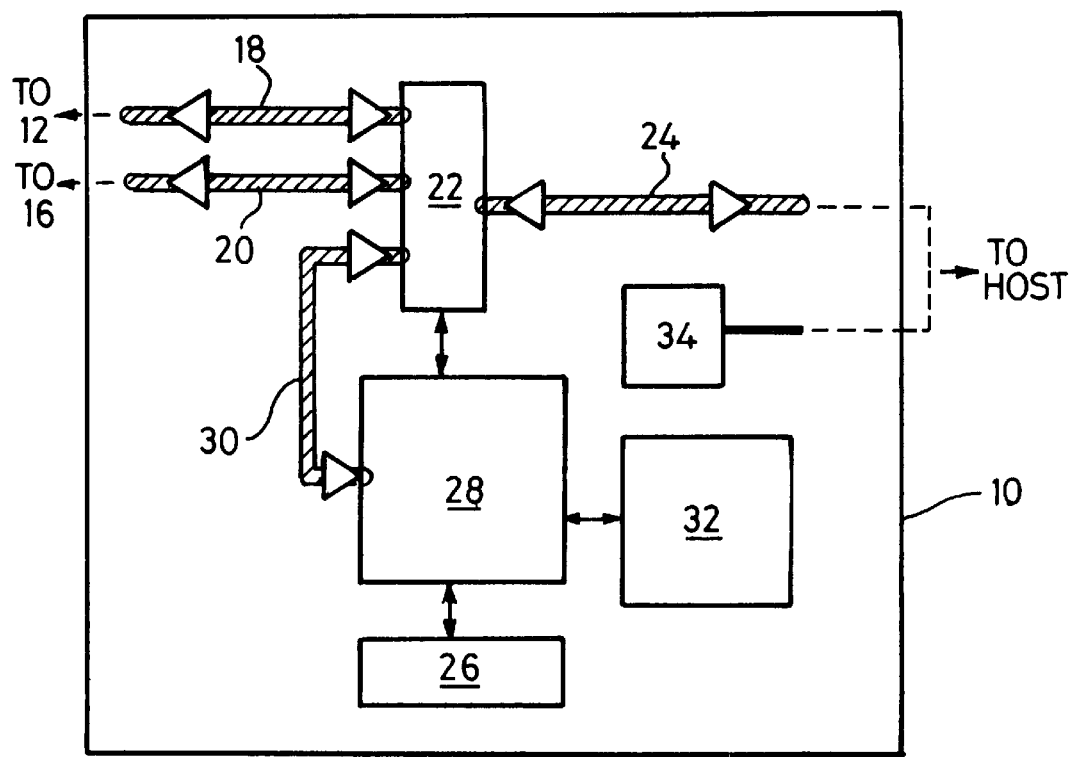
FIG. 2 shows the essential parts of a security module in accordance with the invention.

FIG. 2 shows the essential parts of the security module 10.

A data path 18 from the magnetic card reader 12 and the data path 20 from the smart card reader 16, supply data as appropriate to two data inputs of a multiplexer (MUX) 22. Data from MUX 22 is supplied over a data path 24 to the host equipment such as the card operated ticket dispenser previously referred to. Such devices have been used on buses and as car park ticket dispensing machines.

The module 10 includes a unique identification number stored within a memory 26 in the device which is used in conjunction with a public key based security subsystem which performs a certification of values collected from cards inserted into the reader 12.

A programmable controller 28, for example a Zilog Z80, receives data from the MUX 22 and after processing, transmits data to the MUX along data path 30.

The memory 26 additionally stores data.

A security subsystem 32, for example an ATMEL AT8SC54C, which includes a second processor, serves to archive records (files) of all successful transactions. To this end the security module processor 28 deduces the value of each successful transaction from the data supplied to or from the card and adds this value to the total value collected for each card issuer (who may also be another service/commodity supplier), and to this end each card includes an issuer identification code which is transmitted in the datastream passing between the card reader 12 and the host equipment 14. Typically a look-up table of issuers and identification codes is contained in the computer store 26.

A running total of each issuer is retained in a nonvolatile archive memory in 32 and the appropriate total is updated at the end of a transaction. The data is certified as previously described by means of a digital signature corresponding to the issuer (identified from the data read from the card via MAX 22) and the same information is transmitted along with the new total value for the issuer concerned to the host equipment, for storage in the memory therein in manner known per se.

In this way the transaction value data and card issuer data is archived in the two separate locations and this double redundancy ensures that a full audit trail will always remain to allow the recovery of lost records in the event that one or the other of the archived data is lost.

Power for the security module is typically obtained from the host power supply, usually a DC supply. The power supply for this device 10 is denoted by reference numeral 34. Connections to the host equipment are not shown but the unit may be adapted simply to be plugged into a multiway socket or the like.

In accordance with the method of the invention at the end of a given period (such as a shift for a bus crew or a day or week for a car parking ticket dispensing facility), the data archived in 32 is accessed and read out and transferred to a computer memory in any convenient manner. Thus modules removable from the equipment mounted in a bus may be removed and the data downloaded to a computer at a remote position or on-line or portable data collection devices may be used to transfer data from 32 without the need to remove any unit from the equipment. If a printer is employed, the data may instead or in addition be made available as paper records.

Data concentrating and collecting computers operated by the service/commodity provider(s) (not shown) serve to hold the totals for the different card issuers and this data is available to be downloaded to a central data processing centre (not shown) to enable recharging of the card to purchase service/commodity to be performed.

Since the security module 10 includes a non-volatile memory 32 in which non-resettable totals of transactions values for each issuer whose cards have been used to purchase the particular service or commodity, controlled by the host equipment to which it is connected, in the event of records being lost, then the next time records are collected from the service/commodity host equipment, the records which have been lost will be recovered.

If there is a complete equipment breakdown the security module can be removed from the host and either of the duplicated record stores accessed to remove the data.

As a further security means, the security module 10 holds a unique identifier by which the service host to which it is fitted can be identified.

Security Subsystem (SSS)
Item 32

Typically this is a tamper resistant single smart card chip which has a built in processor and co-processor capable of generating irrefutable digital signals quickly. It also has sufficient non-volatile storage to hold totals from a large number of issuers. Typically the capacity is 500 issuers. This security system can be externally powered separately from the rest of the security module (SM) 10 circuitry such that its contents can be accessed to a central controller even if other components within the SM are faulty.

The digital signatures are generated using public key cryptographic methods. This means a central controller such as is associated with a clearing centre, and any issuer can verify the correctness of the signed files but cannot themselves generate the signatures (ie create new files). If any records are tampered with along the route from a service commodity providers equipment to the clearing centre, it will be discovered and likewise embedded in a security architecture is the means to detect duplicated records and whether or not records are missing. After every transaction the new total is signed with a digital signature.

The digital signature generation is based on a public key scheme (RSA or equivalent) and the SM 10 provides tamper resistant storage of secret keys and is capable of generating a digital signature in less than one second. The result is stored in the security subsystem 32 and sent to the service host.

If the SM is removed (for a reconciliation when all other means cannot be used), the card reader must be disabled and of course the ability to generate valid certificates is lost until another SM is inserted.

The Data Accumulation Protocol

The collection of data pertaining to payment transactions as registered by the SM 10—SSS 32 combination, is handled following a formally defined protocol. This is based on maintaining a running total of transaction values.

The main part of the protocol is implemented in the SSS 32. In the secure and permanent non-volatile memory of this device two accumulation counters (running totals of transaction values and number of transactions) are kept for each issuer of cards. In principle after each transaction the SSS 32 computes a digital signature on the latest value of the stored counters. The digital signature warrants the validity of the counted values as it is based on a unique secret encryption key stored in SSS 32.

After obtaining the digital signature the SM 10 continues the protocol. Together with accumulation countervalues which the SM maintains in parallel in its own memory, the new signature is packed into a number of records and transferred to the service host.

In a later protocol step, the clearing centre (CC) (not shown) receives the records from an SM 10 through its connection to an acquirer host. The CC retrieves from its storage the last known values of the accumulation counters from this host. By subtracting the corresponding counters in the received and stored records, the net amount spent using cards from each issuer is computed. The computed amount is logged on disc and/or paper.

The monetary value based on the computed results is transferred between the issuers records to adjust the issuers balances to show what is owed to who.

The accumulation counter protocol is immune to disruption whether accidental or intentional of the communication from SM to CC. In particular the connection between service host and acquiring host is assumed to be unreliable and that records may get lost or be duplicated without consequence. Primarily the protocol is protected by the digital signature subsidiary protection being obtained by inclusion of SSS and SM identity board numbers and account of the current number of transaction in the signed message.

Ageing

As more and more issuers are recognised by a system the number of totals kept within each SM 10 increases. Whilst each SM can handle a large number of issuer totals, the transmission of records relating to up to 500 issuers becomes time consuming and could affect the ability of a particular service host to process transactions at full speed. To this end the SM is provided with decision making circuitry to omit totals from the records after a suitable interval of inactivity. This interval is determined by the total number of transactions carried out by the SM since the total about to be omitted was last changed. This last number is set by the maximum number of transactions per day plus a significant safety margin to ensure that several copies of records containing the final value of the total amount to be omitted have been captured by the clearing centre. The parameters on which to base decisions to omit can be determined by examination of the transaction history files accumulated at the clearing centre.

Key Changes

Periodically the secret key used by the SM 10 to generate the signature may be changed. In one preferred arrangement this is effected automatically in a pseudo-random manner as determined by the overall number of transactions processed by the SM. These key change instances will be known to the clearing centre for each SM on an individual basis.

Figure 3:
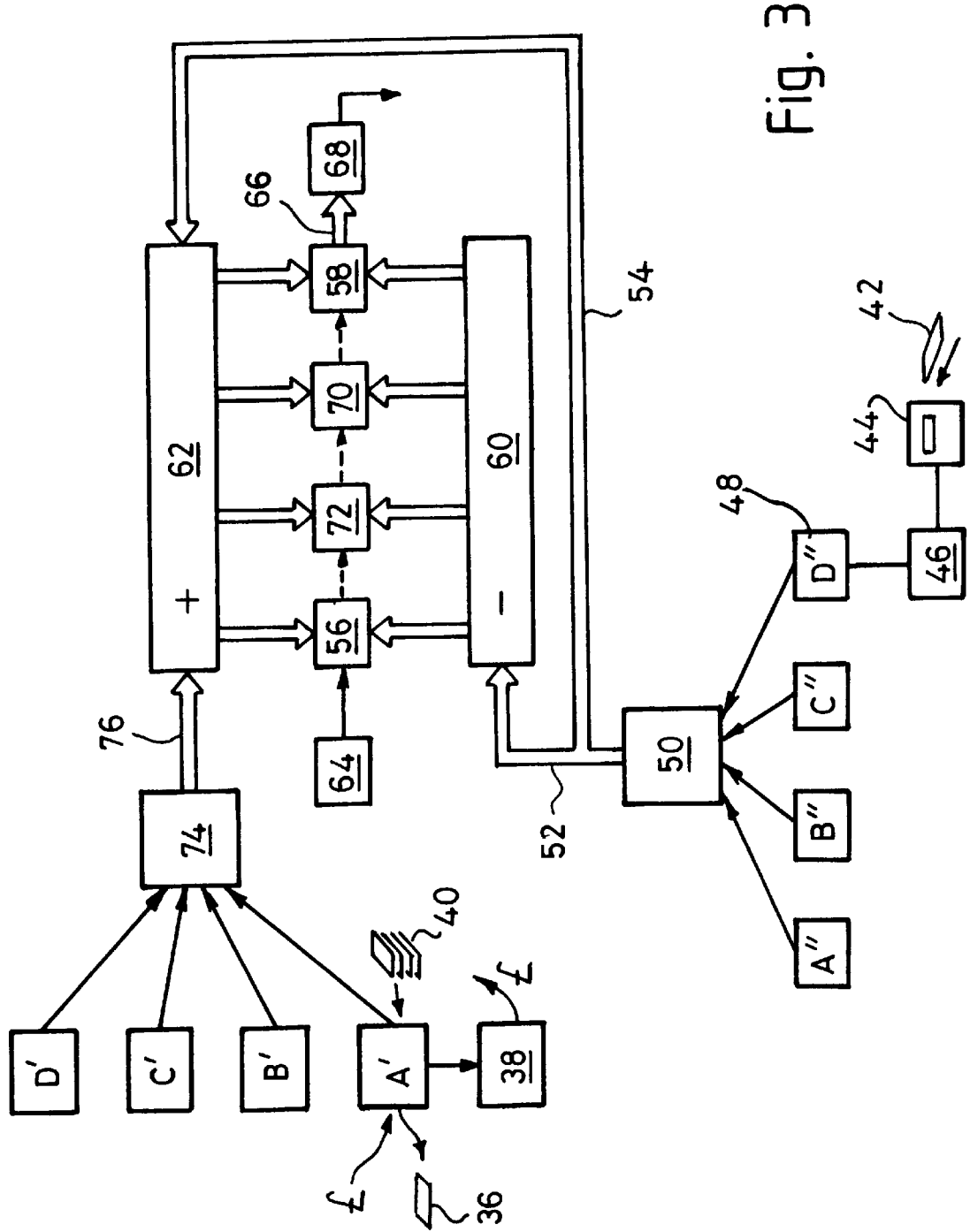
FIG. 3 which is a block diagram illustrating the overall charge and accounting system utilising the security module provided by the invention for identifying the card issuers who are to be credited with transactions as they occur.

FIG. 3 shows in a simplified manner how data relating to different card issuers accounts can be updated periodically for example at the end of each shift in a bus company operation or at the end of each day or week in the case of car parking facilities. The system shown in FIG. 3 does not include the signature generation and data verification steps but is intended merely to show how cards may be sold freely and provided the cards contain the appropriate identification data, can be used to purchase services or commodities from either the original issuer or another organisation or service or commodity provider and how the latter can obtain the necessary credit from a central clearing facility in return for providing the service or commodity required.

In order to simplify matters, only four card issuers are shown and each of the card issuers is also assumed to be a service or commodity provider. To this end card issuing and card operated facilities belonging to each of the four organisations are denoted by the same letter. Again for simplification only one card issuing facility is shown for each of the organisations and one card operated service or commodity provider for each organisation. In practice there may be many card issuing facilities associated with each organisation and many different service and/or commodity providing card operated facilities also owned and operated by the same organisation. Likewise the system is not limited to four issuers/providers but any number can be accommodated, the only limit being the size of the memory capacity of the computers involved. As will be seen later, a card issuer need not also be a commodity or service supplier but may simply be a card issuing facility. In addition a commodity or service provider need not themselves be a card issuing organisation although in general it is expected that they will wish to do so.

A card is issued by the insertion of money (denoted by a £ sign) and the money is retained by the issuer as shown at 38 and this enables further supplies of cards 40 to be purchased for future sale.

The card may be used to purchase any one of four issuers services or commodities. By way of example a card issued by organisation A is shown being used to purchase a commodity valued at £N from a commodity supplier D. To this end the card (identified by 42) and identifiable as being one issued by issuer A, is inserted into a card reader 44 associated with a security module 46 such as 10 in FIG. 1 and a commodity dispenser 48 (such as 14 in FIG. 1). Data corresponding to £N is coupled with the unique identification linked to supplier A and is stored in 46 and 48 as already described.

At the end of the accounting period this data is transferred to a host computer 50. accessed at s polled or otherwise accessed at intervals and the transaction data stored therein is downloaded along data paths 52 and 54. The first is a debit highway and the £N value of the transaction so far described is debited from an account stored in an up/down memory 56 for issuer A and the same value of £N is credited via a credit highway 54 to the account stored in another up/down counter 58 for the commodity supplier D.

Debiting and crediting is achieved by means of addressing circuits 60 and 62.

In order to provide a full audit trail the unique transaction data linked to each transaction by the security module is stored as part of each value in each memory 56, 58 etc. The current total for each issuer can be obtained by addressing means 64 which causes related to the selected memory to be delivered along highway 66 to a printer 68 to deliver printed statements-to the users. In addition or alternatively the data on 66 may be used to automatically debit or credit a bank account designated by the issuer/user concerned.

In the same way a card purchased from issuer C may be used to acquire a commodity from B in which event the value of the transaction will be debited from memory 70 and credited to memory 72.

When cards to a value of £X are purchased by an issuer, the issuers memory 56, 58, 70 or 72 as the case may be is credited with the corresponding value of £X.

It should be noted that an issuer does not need to be a service or commodity supplier. Thus if C is merely a card selling facility but A, B and D are suppliers of services and/or commodities, the memory 70 will only ever be credited whenever cards are purchased for resale by C but will always be debited whenever one of its cards is used to purchase a service or commodity from A or B or D. No card transaction will ever credit memory 70.

On the other hand if B not only provides a service (for example) but also purchases cards for resale, and serves as a card issuer as well, memory 72 will be credited whenever B purchases cards for resale and whenever a card is used to purchase B's service and will be debited whenever a card sold by B is used to purchase another supplier service or commodity.

The crediting of the memories A, B, C, D is achieved by a process 74 and data highway 76. Only four issuers A, B, C and D are shown in FIG. 3 but it is to be understood that any number can be accommodated, it being necessary merely to increase the number of memories 56, 58 etc and the addressing capabilities of the buffer 60 and 62.

Additionally, although only card issuing facility associated with supplier A is shown at A' and one service providing facility belonging to supplier A at A", any number of issuing stations may be provided such as A', and any number of service providing facilities (such as A"), for the supplier A. The same applies to all of the other users of the system.

The data highways 52, 54 and 76 may be permanent land lines, radio, infra-red or optical links, or may simply illustrate the direction in which data is to be transported as by disc or tape or in a solid state memory device from one location to another.

We claim:

1. A security and transaction recording device for use in connection with a card read/write device of a card charging system comprising signal transmission means to deliver signals to a host facility, which signals include a unique identification number, a public key based security subsystem, a record keeping subsystem adapted to certify a credit debited from a card and identify which one of a plurality of accounts is to receive the debited credit, and signal processing and output means for generating signals indicative of a successful transaction.

2. A security device according to claim 1, wherein the host facility is a service providing facility for supply of a service.

3. A security device according to claim 1, wherein the host facility is a product providing facility for supply of a product.

4. A security device according to claim 1, wherein the machine readable card is a magnetic strip card which is read and written to by appropriate card read/write devices.

5. A security device according to claim 1, wherein the card is a smart card and the device includes a smart card reader and further signal processing means, whereby a smart card open payment system is employed in lieu of a prepayment credit card system.

6. A security device according to claim 1, further including a security module in connection with a transaction recording system which receives a specific machine readable card.

7. A security device according to claim 6, wherein the security module recognises a specific identification code and card issuer identification details from a datastream derived from the card and passing between the card reader and host facility.

8. A security device according to claim 7, wherein the security module deduces the value of a successful transaction and adds this to the total value collected for each card issuer, the total value being stored within the security module.

9. A security device according to claim 6, wherein the data is stored in a non-volatile manner in a memory associated with the security module.

10. A security device according to claim 9, wherein the memory is a non-volatile memory and is located in a security subsystem.

11. A security device according to claim 10, wherein the security subsystem is separable from the remainder of the security module.

12. A security device according to claim 10, wherein the security subsystem is a tamper resistant single integrated circuit device which has a built-in processor and co-processor to generate irrefutable digital signatures at high speed.

13. A security device according to claim 10, wherein the security subsystem has sufficient non-volatile storage to hold totals for a plurality of issuers.

14. A security device according to claim 10, wherein the security subsystem is externally powered separately from the rest of the security module circuitry.

15. A security device according to claim 9, wherein the collection of transaction data pertaining to the payment transactions as registered by the combined security module and security subsystem is handled in accordance with a formally defined protocol.

16. A security device according to claim 15, wherein the main part of the protocol is implemented in the security subsystem, the security subsystem computes a digital signature on the latest value of the transaction data and the digital signature warrants the validity of the transaction data.

17. A security device according to claim 16, wherein the security module continues the protocol after obtaining the digital signature and together with accumulating countervalues which the security module maintains in parallel in its own memory, the new signature is packed into a number of records and transferred to the host facility.

18. A security device according to claim 17, wherein the central clearing facility receives the records from the security module through its connection with an acquirer host, and the clearing facility retrieves from its storage the last known values of the accumulating countervalues from the host facility and computes and stores the net amount spent with cards for each issuer.

19. A security device according to claim 6, wherein the card reader is disabled on removal of the security module, so that the ability to generate valid certificates is lost until a security module is inserted.

20. A security device according to claim 6, wherein means is provided within the security module to determine whether to include the total from each of the issuer records.

21. A security device according to claim 20, wherein a criterion for determining not to include the total from a particular issuer record is linked to a time interval during which there has been a lack of activity in relation to that particular issuer record total.

22. A security device according to claim 6, wherein the security module includes means for storing and generating a secret key which is used to generate a digital signature based on a public key scheme and periodically the secret key used by the security module is changed.

23. A security device according to claim 22, wherein the change in the key is automatic in a pseudo-random manner as determined by the overall number of transactions processed by the security module.

24. A security device according to claim 22, wherein the key change instances are known to the clearing facility and are logged and used in decoding and auditing reports from security module data.

25. A security device according to claim 1, wherein the data values associated with the signals are digitally certified.

26. A security device according to claim 1, wherein a new total value for each issuer and previous totals of all cards from all issuers that have been accepted by a particular service host are certified with a digital signature and transmitted to a host facility at the end of each transaction so as to build an audit trail.

27. A security device according to claim 1, wherein a data highway is provided between the host equipment and the card read/write unit to allow the host to transfer the data to the card, so that in use additional information is read and written to the cards by host providers.

28. A security device according to claim 1, wherein each security module holds a unique identifier which is used to identify the host facility to which is it fitted and with which the security module has been used.

29. A security device according to claim 1, wherein a digital signature for each signal is generated using public key cryptographic methods so as to allow verification of the correctness of the signed signals.

30. A security device according to claim 1, wherein means is embedded in the security architecture to detect duplicated records and to detect if records are missing.

31. A security device according to claim 1, wherein each new total is signed with a digital signature based on a public key system and the security module provides a tamper resistant storage of secret keys.

32. A security device according to claim 31, wherein the security module generates the digital signature in less than one second.

* * * * *